US008855901B2

(12) United States Patent
Leader et al.

(10) Patent No.: US 8,855,901 B2
(45) Date of Patent: Oct. 7, 2014

(54) PROVIDING ROUTE RECOMMENDATIONS

(75) Inventors: Adam L. Leader, Scarsdale, NY (US); Andrew Kirmse, Redwood City, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/532,259

(22) Filed: Jun. 25, 2012

(65) Prior Publication Data

US 2013/0345961 A1 Dec. 26, 2013

(51) Int. Cl.
*G06F 19/00* (2011.01)
(52) U.S. Cl.
USPC .......... 701/117; 701/414; 701/415; 701/416; 701/418; 701/420; 701/423; 701/424; 701/425; 701/428; 701/430; 701/431
(58) Field of Classification Search
USPC ......... 701/117–120, 400, 408–421, 423, 429, 701/431; 340/995
See application file for complete search history.

(56) References Cited

U.S. PATENT DOCUMENTS

| | | | | |
|---|---|---|---|---|
| 2004/0243299 A1* | 12/2004 | Scaer et al. | ................... | 701/200 |
| 2006/0149461 A1 | 7/2006 | Rowley et al. | | |
| 2007/0010942 A1* | 1/2007 | Bill | ............................... | 701/209 |
| 2010/0036599 A1* | 2/2010 | Froeberg et al. | .............. | 701/200 |
| 2011/0087426 A1* | 4/2011 | Feng | ............................... | 701/200 |
| 2011/0238289 A1* | 9/2011 | Lehmann et al. | ............. | 701/201 |
| 2011/0246404 A1* | 10/2011 | Lehmann et al. | ............... | 706/21 |

OTHER PUBLICATIONS

Junmanee, et al. "Advanced Recommendations in a Mobile Tourist Information System" *Department of Computer Science, University of Waikato* 33 pages.
Zhuang, et al. "Improving Energy Efficiency of Location Sensing on Smartphones" *Proceedings of the 8th Intrnational Conference on Mobile systems, Applications, and Services (MOBISYS 2010)*, San Francisco, CA Jun. 15-18, 2010.
Ristanovic, et al. "Tracking of Mobile Devices through Bluetooth Contacts" *ACM CoNEXT 2010 Student Workshop*, Philadelphia, USA, Nov. 30-Dec. 3, 2010.
Kwapisz, et al. "Activity Recognition using Cell Phone Accelerometers" *ACM SIGKDD Explorations Newsletter* vol. 12, Issue 2, Dec. 2010.
Lin, et al. "Energy-Accuracy Aware Localization for Mobile Devices".

(Continued)

*Primary Examiner* — Ronnie Mancho
(74) *Attorney, Agent, or Firm* — Fish & Richardson P.C.

(57) ABSTRACT

In one implementation, a computer-implemented method includes obtaining travel information that indicates travel patterns for a mobile computing device that is associated with a user; identifying a current context for the mobile computing device and the user; identifying one or more destination locations that the user has at least a threshold likelihood of travelling to with the mobile computing device based on the current context and the obtained travel information; generating a prediction that one or more events have at least a threshold probability of occurring along one or more of a plurality of routes for travelling to the identified one or more destination locations; selecting a particular route from the plurality of routes to recommend to the user based on the current context and the prediction of the one or more events; and providing route information that identifies the selected particular route.

18 Claims, 7 Drawing Sheets

(56) References Cited

OTHER PUBLICATIONS

Park, et al. "Growing an Organic Indoor Location System" *In Proceedings of 8th Annual International conference on Mobile Systems, Applications and Services (MobiSys)*, Jun. 2010, San Francisco, CA.

Cheng, et al. "Location Prediction Algorithms for Mobile Wireless Systems" *Wireless Internet Handbook* (2003).

Eagle, et al. "Location Segmentation, Inference and Prediction for Anticipatory Computing" *AAAI Spring Symposium: Technosocial Predictive Analytics* (2009).

Liao, et al. "Learning and Inferring Transportation routines" *American Association for Artificial Intelligence* (2004).

Liao, et al. "Extracting Places and Activities from GPS Traces Using Hierarchical Conditional Random Fields" *The International Journal of Robotics Research*, vol. 26, No. 1 (Jan. 2007).

Hoh, et al. "Enhancing Security and Privacy in Traffic-Monitoring Systems" *IEEE* (2006).

* cited by examiner

PROVIDING ROUTE RECOMMENDATIONS

TECHNICAL FIELD

This document generally describes providing route recommendations on a mobile computing device.

BACKGROUND

Mobile computing devices (e.g., smartphones, tablet computers, personal digital assistants (PDAs)) have been configured to provide users with navigation information. For example, mobile computing devices have been configured to provide driving directions from a first geographic address to a second geographic address. Such devices may include Global Positioning System (GPS) capabilities that provide global positioning information, such as latitude and longitude information, which can indicate a current geographic location for a mobile computing device. Global positioning information for a mobile computing device can be used by the mobile computing device and/or by a back-end computer system (e.g., a cloud computing system) to provide driving directions from a mobile computing device's current geographic location to a desired destination location.

SUMMARY

This document describes providing route recommendations on a mobile computing device (e.g., a cellular telephone, smart telephone, a PDA, a portable media player, etc.). Route recommendations can include directions for travelling from a starting geographic location to one or more destination geographic locations. Route recommendations can be provided based on a variety of factors, such as a current context for a mobile computing device (e.g., current geographic location, time of day, day of the week) and/or events that are external to the mobile computing device (e.g., traffic jams).

For example, if a mobile computing device is identified as being located at a user's home in the morning on a work day (M-F), it can be determined that the user is likely to be travelling to his/her place of work in the near future. This work location can serve as a likely destination location to which the user and the mobile computing device may travel in the near future. Various candidate routes can be identified for travelling from the user's home to the user's place of work and one or more candidate routes can be recommended to the user based on a variety of factors, such as predictions made regarding whether one or more external events may occur at a future time along one or more of the candidate routes. For instance, predictions can be made that indicate a likelihood that one or more external events (e.g., rush hour traffic, the conclusion of events that may result in a large number of people will be leaving a particular area (e.g., end of a sporting event, concert), and/or severe weather (e.g., thunderstorm, blizzard)) will occur along one or more of the candidate routes. Such insights regarding events that may be unknown or uncertain to users can be provided by a computer system that is able to detect and/or estimate such events (e.g., predict when sunset glare will impact traffic speeds based on levels of cloud cover, time of day, time of year, and/or sightlines of road).

In one implementation, a computer-implemented method includes obtaining, at a computer system, travel information that indicates travel patterns for a mobile computing device that is associated with a user; identifying a current context for the mobile computing device and the user, wherein the current context includes at least a current geographic location where the mobile computing device is currently located; identifying, by the computer system, one or more destination locations that the user has at least a threshold likelihood of travelling to with the mobile computing device based on the current context and the obtained travel information; generating a prediction that one or more events have at least a threshold probability of occurring along one or more of a plurality of routes for travelling from the current geographic location to the identified one or more destination locations; selecting, by the computer system, a particular route from the plurality of routes to recommend to the user based on the current context and the prediction of the one or more events; and providing, by the computer system, route information that identifies the selected particular route.

Such a computer-implemented method can include one or more of the following features. The current context can include a current time of day, a current date, and one or more calendar events for the user. The current context can include recent user activity with regard to one or more applications that are installed on the mobile computing device. The one or more applications can be selected from the group consisting of: an email application, a calendar application, a texting application, a voicemail application, a telephone application, and a social networking application. The current context can include one or more events that are associated with the user and that were or are scheduled to occur within a threshold period of a current time. The one or more events can be identified from an electronic calendar that is associated with the user or from correspondence between the user and other users using one or more modes of communication on the mobile computing device. The travel information that indicates travel patterns for the user can be obtained from a user model that is associated with the user. The particular route can be selected from the plurality of routes based on the one or more events being predicted to affect travel along the one or more routes by at least a threshold amount of time. The route information identifying the particular route can be provided without being prompting by the user. The route information can be provided to the user in response to user input that indicates a request for a route recommendation. The computer system can be the mobile computing device; and providing the route information can include outputting the route information on the mobile computing device. Outputting the route information on the mobile computing device can include displaying, on a display of the mobile computing device, a map that depicts the particular route or displaying textual directions for travelling along the particular route. Outputting the route information can include audibly outputting, using one or more speakers of the mobile computing device, directions for travelling along the particular route. The computer system can be separate from the mobile computing device; and the method can further include: receiving, at the computer system and from the mobile computing device, a request to provide a route recommendation for the user of the mobile computing device, wherein the request includes information that identifies the mobile computing device and at least a portion of the current context of the mobile computing device or the user; and wherein the route information is provided by the computer system to the mobile computing device and causes the mobile computing device to output information describing the particular route.

In another implementation, a mobile computing device includes an input subsystem programmed to detect a current context for the mobile computing device and a user of the mobile computing device, wherein the current context includes at least a current geographic location where the mobile computing device is currently located; a travel monitor unit programmed to obtain travel information that indicates travel patterns for the mobile computing device; a destination unit programmed to identify one or more destination locations that the user has at least a threshold likelihood of travelling to with the mobile computing device based on the current context and the travel information; an event prediction unit programmed to generate predictions that one or more events have at least a threshold probability of occurring along one or more of a plurality of routes for travelling from the current geographic location to the identified one or more destination locations; a recommendation unit programmed to select a particular route from the plurality of routes to recommend to the user based on the current context and the prediction of the one or more events; and an output subsystem of the mobile computing device that is programmed output route information that identifies the selected particular route to the user of the mobile computing device.

Such a mobile computing device can include one or more of the following features. The mobile computing device can also include a route unit programmed to identify the plurality of routes based, at least in part, on the one or more destination locations identified by the destination unit. The output subsystem can include a display of the mobile computing device that is configured to visually output the route information. The output subsystem can include a speaker system of the mobile computing device that is configured to audibly output the route information. The travel information that indicates travel patterns for the user can be obtained from a user model that is associated with the user.

In another implementation, a computer program product embodied in a computer readable storage device storing instructions that, when executed, cause a computing system having one or more processors to perform operations including: obtaining travel information that indicates travel patterns for a mobile computing device that is associated with a user; identifying a current context for the mobile computing device and the user, wherein the current context includes at least a current geographic location where the mobile computing device is currently located; identifying one or more destination locations that the user has at least a threshold likelihood of travelling to with the mobile computing device based on the current context and the obtained travel information; generating a prediction that one or more events have at least a threshold probability of occurring along one or more of a plurality of routes for travelling from the current geographic location to the identified one or more destination locations; selecting a particular route from the plurality of routes to recommend to the user based on the current context and the prediction of the one or more events; and providing route information that identifies the selected particular route.

The details of one or more embodiments are set forth in the accompanying drawings and the description below. Various advantages can be realized with certain implementations. For example, helpful information can be proactively provided to users without users having to request such information. This can save a user the time of having to request such information and can help users make more informed decisions before action is taken. For instance, information about the likelihood of external events that may affect travel for a user can be provided to a user at an opportune time (e.g., before the user has made a decision regarding a travel route and taken steps to travel along such a route). Insights and direction can be provided based on information aggregated from multiple sources, reducing the interaction between a user and a device, and reducing the amount of information for the user to consider while making decisions. Information can also be provided when it is determined to be highly likely that a user may be interested in such information, reducing user interruptions and the need for users to formulate requests for such information (e.g., launch an application and enter parameters for a search into the application). Users can also be provided with information for routes that they would likely prefer even if such routes are unknown to the users, such as scenic routes that a user may enjoy while on vacation.

In another example, by providing users with unprompted travel recommendations, users who are preoccupied with another task (e.g., operating motor vehicles, cooking) can receive recommendations without having to provide input (e.g., voice input), which can be distracting and potentially dangerous to the user. For instance, a user driving a car can receive travel recommendations without having to ask for such recommendations, which can allow the user to maintain focus on driving.

In another example, some recommendations might be determinable far enough in advance so as to provide users with sufficient time to make alternate plans based on the recommendation information. This can provide users with a variety of benefits, including allowing users to more efficiently schedule their activities and time. For instance, if the end of a sporting event is determined to be likely based on the score from a data feed, then a prediction of the resulting traffic impact from the game ended can be made. Based on the prediction, a recommendation can be provided to a user who is likely to be affected by the traffic impact to do an alternate task, such as going to the gym and/or running errands so that they can stall/wait out the traffic until a later time.

Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
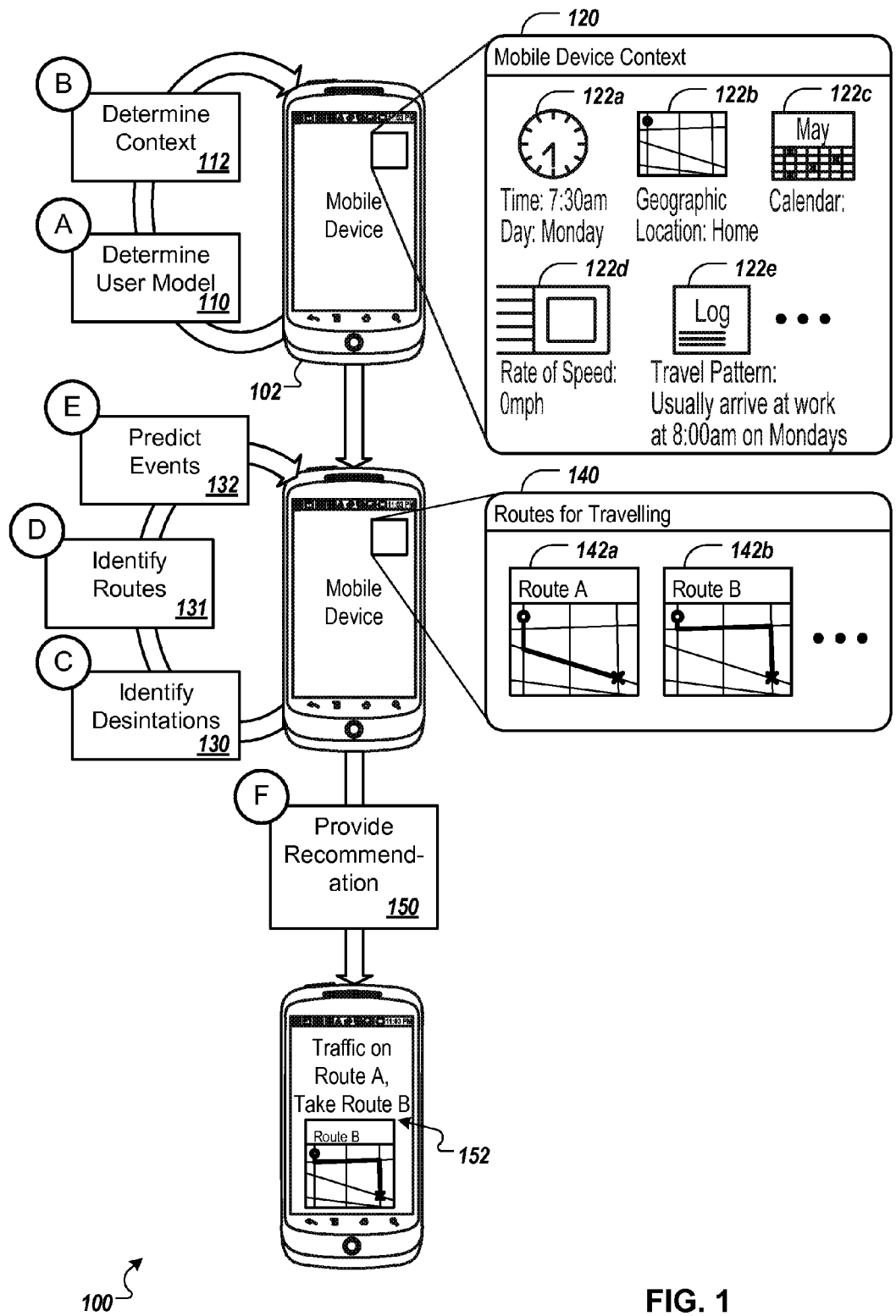
FIG. 1 is a conceptual diagram of an example mobile computing device for providing route recommendations to a user.

This document describes providing context-based recommendations to users with regard to user travel. Travel recommendations can be automatically provided to a user at appropriate times based on a current context (e.g., time of day, geographic location, calendar appointments) of a user's mobile device (e.g., a mobile phone, smartphone, personal digital assistant (PDA), portable media player, tablet computer, or another appropriate sort of mobile device) and/or patterns of user behavior (e.g., regular commuting times and routes, regular meal times, historical meeting attendance, etc.). As opposed to manually starting an application, searching for desired information, and perusing search results, users may receive an automatic notification including information that is determined to likely be relevant to the user at a time that the user may act upon the information.

Contextual information from multiple sources may be aggregated, and may be used to provide insights and recommended actions, as opposed to solely providing the contextual information to the user. For example, if a particular user regularly commutes to work via automobile and regularly arrives at eight o'clock each morning, the user's mobile device can wake the user at an optimal time, based on the time it generally takes the user to complete his or her morning routine, and based on external conditions that are determined to possibly affect the user's commute (e.g., traffic, weather, road closures). In another example, if it is raining or is scheduled to rain, for example, instead of solely delivering a weather report to the user, the mobile device can determine the weather's potential impact on traffic, can wake the user earlier than a usual time, can recommend a time for the user to leave for work, and can recommend that the user bring an umbrella. Thus, external events that may affect a user's normal routine can be identified and an alert can be provided to the user when data indicates that the user should deviate from a normal routine to avoid a negative consequence of such external events, such as a time delay.

Information may be provided that is determined to be likely of interest to users, at opportune times. For example, if the user is currently driving his or her vehicle and an accident occurs along the route, the user's mobile device may predict that the accident will impact the user's travel time. In the present example, the user's mobile device may determine that such information is highly likely to be of interest to the user at the current time, and thus the device can provide a recommendation that the user switch lanes or can present the user with an alternate route in advance of the user reaching the point of the accident. Information regarding external events that are unlikely to be of interest to the user while driving, such as an accident on a road that is not along the user's route, can be suppressed while the user is driving, and can be presented if it is likely to become relevant to the user at a later time, such if the user's driving route changes to include the road with the accident.

Information may be provided to a user in a manner that is appropriate for the user's current context. For example, while the user is driving, the user's mobile device can provide audible (e.g., voice) recommendations, such as turn-by-turn directions. While the user is stationary, for example, the user's mobile device can provide recommendations visually (e.g., via text, graphics, maps, etc.). Thus, information may be presented in a way that is appropriate and that minimizes necessary user interaction.

The systems discussed here may use information about users within user-defined privacy parameters. For instance, users may be provided with an opportunity to opt in/out of programs that may use personalized information, such as user location information. In addition, certain data may be anonymized in one or more ways before it is stored and/or used, so that personally identifiable data is removed.

FIG. 1 is a conceptual diagram 100 of an example mobile computing device 102 for providing route recommendations to a user. The example diagram 100 provides an illustrative example of the mobile computing device 102 determining a user model, determining a current context for the user, identifying locations to which the user may travel, predicting events that may affect user travel, and providing recommendations to the user.

The mobile computing device 102 can determine a user model associated with a device user (110). The user model can be generated using various data sources (e.g., location history, search history, calendar items, email, text messages, social network information, etc.), for example, and can include user activity and travel patterns. In some implementations, when generating a user model, data from one source may be used to filter noise from another source. For example, user location data may be used to check calendar data to identify regularly scheduled meetings that the user rarely and/or frequently attends. As another example, user location data may be used in conjunction with search history data to identify places of interest to the user that result in user visits to such places (e.g., user searches for restaurants frequently result in the user travelling to the viewed restaurants). User models may be generated and maintained in batch mode and/or real-time, for example, and may be maintained on the mobile computing device 102, one or more servers in communication with the device 102, or any combination thereof.

The mobile computing device 102 can determine a current context for the device 102 and/or a user of the device 102 (112). The current context may include information that describes the present state and/or surroundings of the mobile computing device 102 and/or the user of the mobile computing device. For instance, the current context can include a variety of information related to the mobile computing device 102 and the user, such as information regarding the surrounding physical environment (e.g., geographic location, weather conditions, nearby businesses, volume of ambient noise, level of ambient light, image captured by the mobile device's camera, etc.), the present state of the mobile computing device 102 (e.g., rate of speed, touchscreen input activated, audio input activated, ringer on/off, etc.), time and date information (e.g., time of day, date, calendar appointments, day of the week, etc.), user activity (e.g., recent user activity, habitual user activity), etc. The current context can be determined by the mobile computing device 102 using data and sensors that are local and/or remote to the mobile computing device 102. At least a portion of the current context may be obtained from one or more other computing devices that are remote from the computing device 102, such as a remote computer system that provides weather information and/or a remote computer system that provides traffic information.

As indicated by the example context 120 for the mobile device, the current context for the mobile computing device 102 includes time/date information 122a, geographic location information 122b, calendar information 122c, rate of speed information 122d, and travel pattern information 122e. In the depicted example, the time/date information 122a lists the time as 7:30 am on a Monday and the geographic information 122b indicates that the mobile computing device 102 is currently located at the user's home. The calendar information 122c indicates that the user has no appointments scheduled for the day and the rate of speed information 122d indicates that the mobile computing device 102 is currently stationary (travelling at 0 miles per hour). The travel pattern information 122e indicates that the device user usually arrives at work at 8:00 am on Mondays.

Based on this example context 120, the mobile computing device 102 can identify one or more locations to which the user has at least a threshold likelihood of travelling (130). In the present example, based on the time/date information 122a (i.e., a current time of 7:30 am), the geographic location information 122b (i.e., that the device 102 is currently located at the user's home), and the travel pattern information 122e (i.e., that the device user generally arrives at work at 8:00 am Monday mornings), the mobile computing device 102 may determine that a high likelihood (at least a threshold likelihood) exists that the user intends to travel to his or her workplace in the near future (e.g., within the next 5, 10, 30, 60 minutes). Based on the calendar information 122c (i.e., no appointments scheduled), the mobile computing device 102 may increase the likelihood that the user intends to travel to work. As another possibility, if the calendar information 122c had included a dental appointment for Monday at 8:00 am, and the mobile computing device 102 determines that the user rarely misses such appointments (e.g., based on historic travel patterns when dental appointments were included on the user's calendar), the device 102 may determine a high likelihood (at least a threshold likelihood) that the user intends to travel to the location of the dental appointment. In the present example, the mobile computing device 102 determines that a high probability (e.g., 50%, 755, 90%, 95%, 99%, or another suitable threshold) exists that the user intends to travel to his or her workplace.

As indicated by the example routes for travelling 140 to one or more destination locations that the mobile computing device 102 was determined to have at least threshold likelihood of travelling to, the mobile device 102 can identify various routes 142a, 142b, etc., that the user may take from his or her current location (e.g., home) to the identified one or more candidates destinations (e.g., work, dental office) (131). In some implementations, the identified routes may include routes that the user has historically used for travelling between the current location and the destination. For example, route 142a may be a regular travel route, and the route 142b may be an occasionally used alternate route. In some implementations, the identified routes may include one or more routes determined by a route planning algorithm. For example, if the user is in an unfamiliar area, or if the user's current and/or destination locations are unfamiliar, the computing device 102 and/or a backend system may generate potential routes for the user.

The mobile computing device 102 can predict one or more external events (132) that may affect user travel to the identified destination locations, and can predict the impact (e.g., time lost, inconvenience, percentage increase to travel time) such events may have on user travel. For example, the routes 142a and 142b may be routes the user has taken with his or her automobile. In the present example, the mobile computing device 102 may determine that construction is currently taking or about to take place along the route 142a, and that the construction will likely cause a traffic delay that would negatively impact the user's travel time (e.g., add 5 minutes to a 15 minute commute). However, the mobile computing device 102 may determine that the route 142b is relatively free of circumstances that would delay the user while travelling to the user's destination.

The mobile computing device 102 can provide one or more route recommendations (150) to the device user based on the one or more destinations that the user has at least a threshold likelihood of travelling to, routes for travelling to the one or more destinations, and/or external events that are predicted to affect travel along the one or more routes. As the user leaves for work, for example, the mobile computing device 102 can compute an estimated travel time for travel along each of the routes 141a, 142b, etc., and can provide a recommendation that the user take the route associated with the shortest time estimate. As another possibility, the mobile computing device 102 can provide a list of possible travel routes along with projected destination arrival times for each route, enabling the user to select his or her preferred route. As another possibility, if the user habitually takes the same route to work every day, the mobile computing device 102 can estimate time of travel along the route, and provide a recommendation that the user leave at a certain time to reach his or her destination at a preferred time (e.g., "Leave here at 7:35 am and take Main Street to arrive at work at 8:00.").

As depicted in the diagram 100, an example route recommendation 152 is output on a display of the mobile computing device 102. The example route recommendation 152 includes both textual and graphical information regarding the candidate routes 142a-b and an external event (traffic) that is likely to affect travel along route A 142a. As discussed above, route recommendations can be provided by the mobile computing device 102 in any of a variety of appropriate ways, such as visually on a display (e.g., touchscreen display) of the computing device 102, audibly using one or more speakers of the mobile computing device 102, and/or through an output mechanism on another computing device (e.g., output on a car GPS unit and/or audio system, output on television) that is in communication with the mobile computing device 102.

Figure 2A:
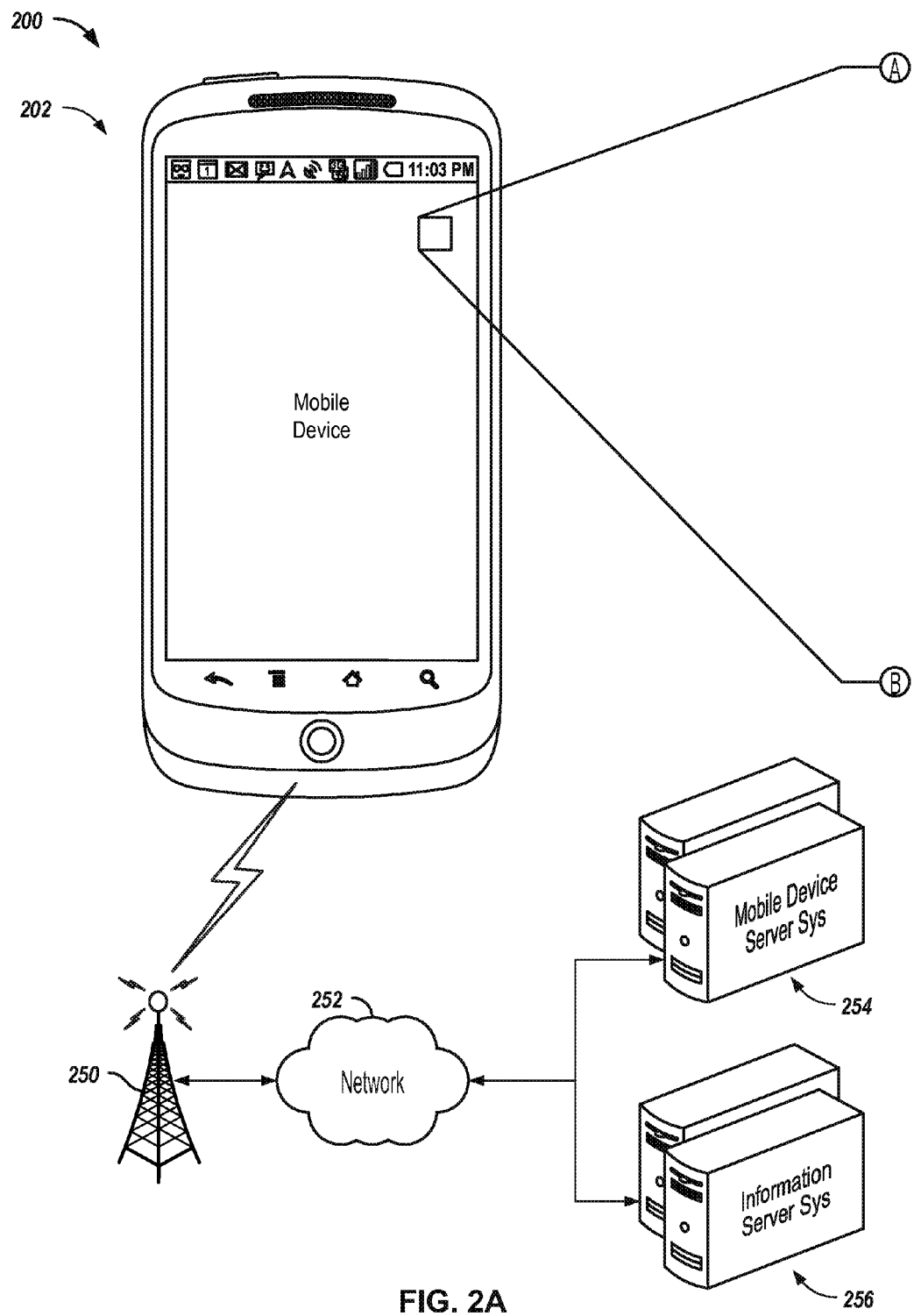
FIGS. 2A-B are diagrams of an example system for providing route recommendations on a mobile computing device.
Figure 2B:
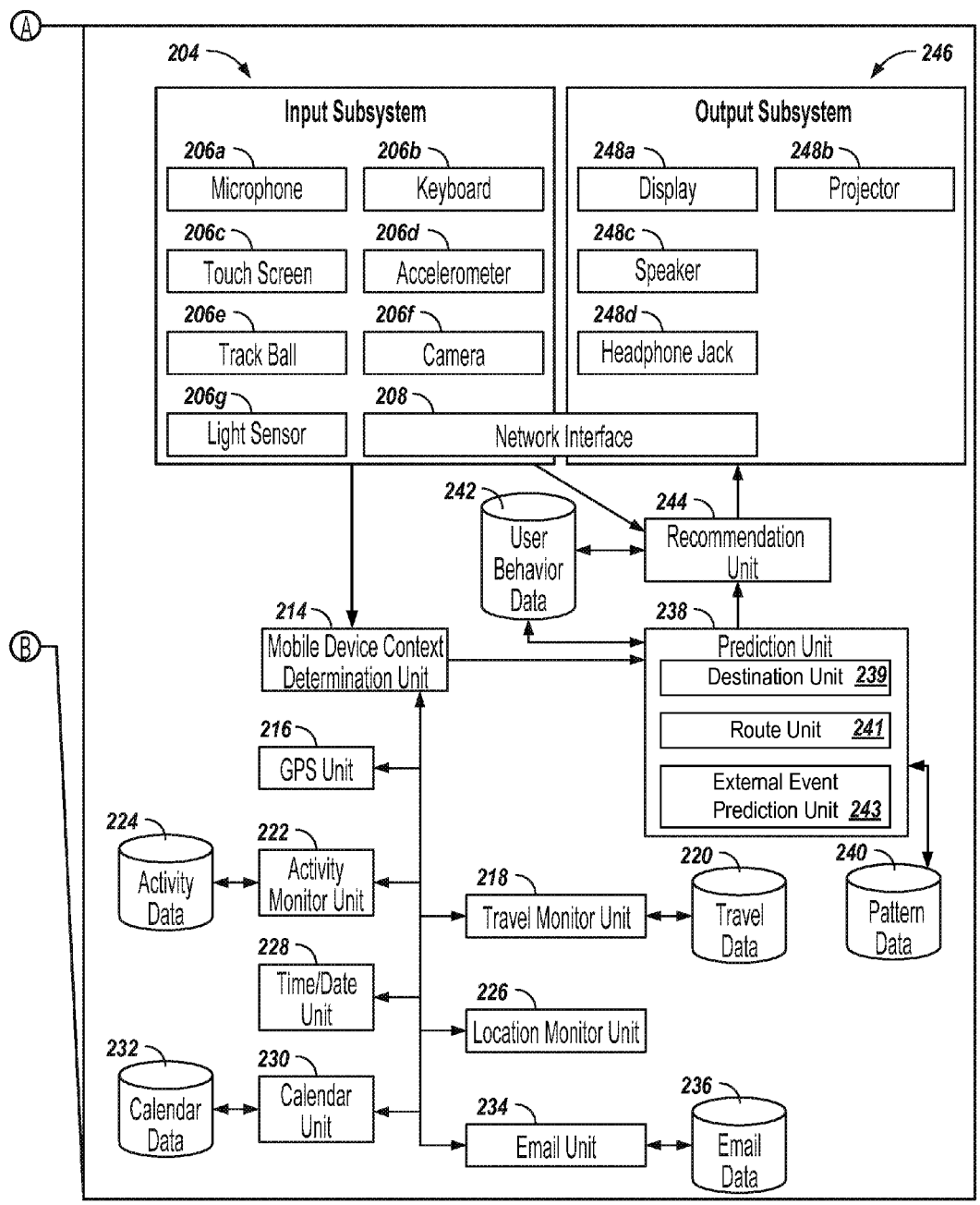

FIGS. 2A-B are diagrams of an example system 200 for providing route recommendations on an example mobile computing device 202. The mobile computing device 202 can be configured to provide route recommendations based upon a current context associated with the mobile computing device 202 and/or a user of the mobile computing device, similar to the mobile computing device 102 described above with regard to FIG. 1.

The mobile computing device 202 can be any of a variety of appropriate computing devices, such as a smartphone, a cell phone, a tablet computing device, a personal digital assistant (PDA), a laptop computer, a netbook, and/or a GPS computing device. The mobile computing device 202 is depicted as including an input subsystem 204 through which a user of the mobile computing device 202 can provide input to various applications, such as input for web browsers, search engines, mapping applications, calendar applications, email systems, and the like. Referring to FIG. 2B, the input subsystem 204 is depicted as including a microphone 206a (configured to receive audio-based input), a keyboard 206b (configured to receive key-based input), a touchscreen 206c (configured to receive screen touch-based input), an accelerometer 206d (configured to receive motion-based input), a trackball 206e (configured to receive GUI pointer-based input), a camera 206f (configured to receive visual input), and a light sensor 206g (configured to receive input based on light intensity). The input subsystem 204 also includes a network interface 208 (e.g., wireless network interface, universal serial bus (USB) interface, BLUETOOTH interface, public switched telephone network (PSTN) interface, Ethernet interface, cellular network interface, 3G and/or 4G network interface, etc.) that is configured to receive network-based input and output. Other types of input devices not mentioned may also be part of the input subsystem 204.

A mobile device context determination unit 214 can determine a current context for the mobile device 202 using a variety of context monitoring units of the mobile computing device 202. For instance, a global positioning system (GPS) unit 216 can provide geographic location information to the mobile device context determination unit 214 and a travel monitor unit 218 (in conjunction with a travel data repository 220) can provide information related to a route currently being traveled and habitual routes traveled by the mobile computing device 202. An activity monitor unit 222 (in conjunction with an activity data repository 224) can provide information related to recent and habitual user activity (e.g., applications used, specific information accessed at various times, etc.) on the mobile device 202. A location monitor unit 226 can provide information regarding entities (e.g., businesses, parks, festivals, public transportation, etc.) geographically located near the current geographic location for the mobile device 202. A time and date unit 228 can provide current time and date information and a calendar unit 230 (in conjunction with a calendar data repository 232) can provide information related to appointments for the user. An email unit 234 (in conjunction with an email data repository 236) can provide email-related information (e.g., recent emails sent/received). The mobile context determination unit 214 can receive information from other context monitoring units not mentioned or depicted.

In some implementations, the mobile device context determination unit 214 and/or the context monitoring units 216-236 can be implemented in-part, or in-whole, remote from the mobile computing device 202. For example, the email unit 234 may be a thin-client that displays email-related data that is maintained and provided by a remote server system. In such an example, the email unit 234 can interact with the remote server system to obtain email-related information to provide to the mobile device context determination unit 214.

A prediction unit 238 can use the current context for the mobile device 202, as determined by the mobile device context determination unit 214, to identify routes for recommendation to a user of the mobile computing device 202 based on a variety of factors, such as user travel patterns and possible external events that are likely to affect user travel. The prediction unit includes a destination unit 239, a route unit 241, and an external event unit 243. The destination unit 239 is programmed to identify candidate destination locations to which a user has at least a threshold likelihood of travelling within a period of time (e.g., within the next 15, 30, 60 minutes). The route unit 241 is programmed to identify possible routes for travelling to the candidate destination locations from a current geographic location of the mobile computing device 202. The external event prediction unit 243 is programmed to identify one or more external events that have at least a threshold likelihood of occurring along the one or more routes identified by the route unit 241. Together, the destination unit 239 and the route unit 241 can predict potential travel by the user, and the external event prediction unit 243 can predict events external to the mobile computing device 202 that may impact the user along possible travel routes. The prediction unit 238 can use a variety of information in addition to context information provided by the context determination unit 214 to provide such predictions of user travel and external events, such as environmental information (e.g., weather information), travel information (e.g., traffic information, driving directions, transportation schedule information, map information), geographic proximity information (e.g., nearby business information), recently updated information (e.g., real-time news updates, blog updates, email/texting conversation updates), and personal information (e.g., calendar appointments for a user, contact information for a user's acquaintances, information related to a user's social network). Other categories of information not mentioned may be used and identified by the prediction unit 238.

The destination unit 239 can identify candidate destination locations using context information from the context determination unit 214 and travel patterns for a user of the mobile computing device 202 that are stored in a pattern data repository 240, which can define information and provide various contextual factors that have influenced or impacted past user travel (e.g., via rules, scoring techniques, etc.). The pattern data repository 240 can include predefined data and/or user defined data. The data stored in the pattern data repository 240 can be subject to change over time (e.g., the mobile computing device 202 can "learn" a user's travel patterns in various contexts and can adjust the data stored in the pattern data repository 240 over time).

The destination unit 239 can additionally use data stored in a user behavior data repository 242 to identify correlations between user activity on the computing device 202 (or other computing devices) and travel patterns. Such information can be used to generate and maintain a user model correlating user behavior to travel patterns. Various data sources may be used for generating and maintaining user models, such as user location history, user search history, user calendar items, and other appropriate sources. For example, to generate and maintain a user model, the user behavior data repository 242 can log previous user travel occurrences (e.g., commuting routes, errand trips, etc.), a context for the mobile device 202 during the travel, and the user's behavior before and after travel (e.g., activity preceding travel, physical travel of the mobile computing device 202 following a previous recommendation) with respect to information provided by the mobile device 202.

The user behavior data stored in the user behavior data repository 242 can indicate whether a user found a provided recommendation to be relevant given the mobile device's 202 context. For example, if the user is provided with a list of nearby entities (e.g., restaurants located geographically near the device's current geographic location) upon identifying that the user is in a city away from home and that it is the user's typical dinnertime, and the mobile device 202 travels to one of the restaurants, then the associated user behavior data can indicate that the user found the recommendation to be relevant given the device's context. In another example, if the user is provided with the list of nearby restaurants and the user immediately opens a calendar application to locate information for an upcoming meeting, then the associated user behavior can indicate that the user found the recommendation to not be relevant (e.g., the user wanted information related to the meeting instead of restaurant information).

The destination unit 239 can use user behavior data from the user behavior data repository 242 to identify information that is related to potential user activities and destinations, and information that is likely to be relevant to user travel along various routes to the destinations. For example, the destination unit 239 can consider previous contexts that are similar to a current context for the mobile device 202 to identify candidate destinations that have at least a threshold likelihood of being relevant to a user of the computing device 202 within a period of time (e.g., within the next 10 minutes, within the next hour).

The route unit 241 can identify one or more routes for travelling to the candidate destinations that have been identified by the destination unit 239. The route unit 241 may use the pattern data 240, the user behavior data 242, and/or information from an external source (e.g., a route planning computer system) to identify the one or more routes.

The external event prediction unit 243 can determine whether there are any external events that may affect travel along the one or more routes identified by the route unit 241 in the near future. The possible occurrence of a variety of external events can be analyzed by the external event prediction unit 243, such as traffic, weather-related slowdowns (e.g., storms, snow, rain), road construction, and/or entertainment events (e.g., sporting events, concerts). The external event prediction unit 243 can predict the occurrence of external events within a period of the current time (e.g., within the next 15 minutes, the next hour, the next 6 hours). External events that are determined to affect travel along routes identified by the route unit 241 by at least a threshold amount of time (e.g., add at least 5, 10, 15 minutes to travel time, increase travel time by at least 20%, 25%, 50%) can be identified by the external event prediction unit 243.

Using information identified by the prediction unit 238 and/or the user behavior data 242, a recommendation unit 244 can provide one or more route recommendations. For example, the prediction unit 238 can provide information that identifies one or more routes to one or more destinations that the user has been determined to be likely to travel to within a threshold period of time and information that identifies one or more possible events that are likely to occur at a future time along the routes, and the recommendation unit 244 can use the information in combination with data from the user behavior data 242 to provide a recommendation to a user of the computing device 202. The recommendation unit 244 can use the user behavior data 242 to determine whether a user of the computing device 202 is likely to find a particular recommendation to be relevant over other recommendations (e.g., based on past user behavior in response to other recommendations) and can use such a determination to identify one or more route recommendations to provide. In addition, the recommendation unit 244 can use data from the user behavior data 242 to identify various routes that the user has taken to the destination locations. For instance, a user may travel to a particular destination location for a recurring (e.g., weekly, monthly, etc.) meeting, but may occasionally take public transportation. If the prediction unit 238 determines that traffic along the user's regular route is likely to be congested (e.g., based on projected rush hour traffic, weather conditions, construction, or other such circumstances), the recommendation unit 244 may provide a recommendation to the user that he or she take public transportation to the meeting instead.

Processing can be performed local and/or remote to the mobile computing device 202. For instance, in implementations where a calendar application is implemented locally on the mobile computing device 202, prediction and recommendations processing can be performed locally on the mobile computing device 202. In another example, in implementations where calendar data for a calendar application is provided on a remote server system, the mobile computing device 202 can interact with the remote server system to access the relevant calendar information. In another example, in implementations where the prediction and recommendation unit 244 is executed by a remote server system, the prediction and recommendation unit 244 can interact with the calendar application (e.g., local or remote) to access the relevant calendar information and to make predictions and recommendations based at least in part on such information. The various units 214-244 can be implemented in any of a variety of appropriate ways, such as in hardware (e.g., application-specific integrated circuits), software, firmware, or any combination thereof.

An output subsystem 246 of the mobile computing device 202 can provide results obtained by the recommendation unit 244 to a user of the device 202. The output subsystem 246 can include a variety of output devices, such as a display 248a (e.g., a liquid crystal display (LCD), a touchscreen), a projector 248a (e.g., an image projector capable of projecting an image external to the device 202), a speaker 248c, a headphone jack 248d, etc. The network interface 208 can also be part of the output subsystem 246 and may be configured to provide the results obtained by the recommendation unit 244 to another computing or output device (e.g., transmit results to BLUETOOTH headset, transmit results to another computing device).

Referring to FIG. 2A, the mobile computing device 202 can wirelessly communicate with wireless transmitter 250 (e.g., a cellular network transceiver, a wireless network router, etc.) and obtain access to a network 252 (e.g., the Internet, PSTN, a cellular network, a local area network (LAN), a virtual private network (VPN), etc.). Through the network 252, the mobile computing device 202 can be in communication with a mobile device server system 254 (one or more networked server computers), which can be configured to provide mobile device related services and data to the mobile device 202 (e.g., provide calendar data, email data, connect telephone calls to other telephones, etc.).

The mobile device 202 can also be in communication with one or more information server systems 256 over the network 252. Information server systems 256 can be server systems that provide information that may be relevant to user travel. For instance, information server systems 256 can provide current traffic conditions, a weather forecast, and information regarding businesses located near the current geographic location for the mobile device 202.

Figure 3A:
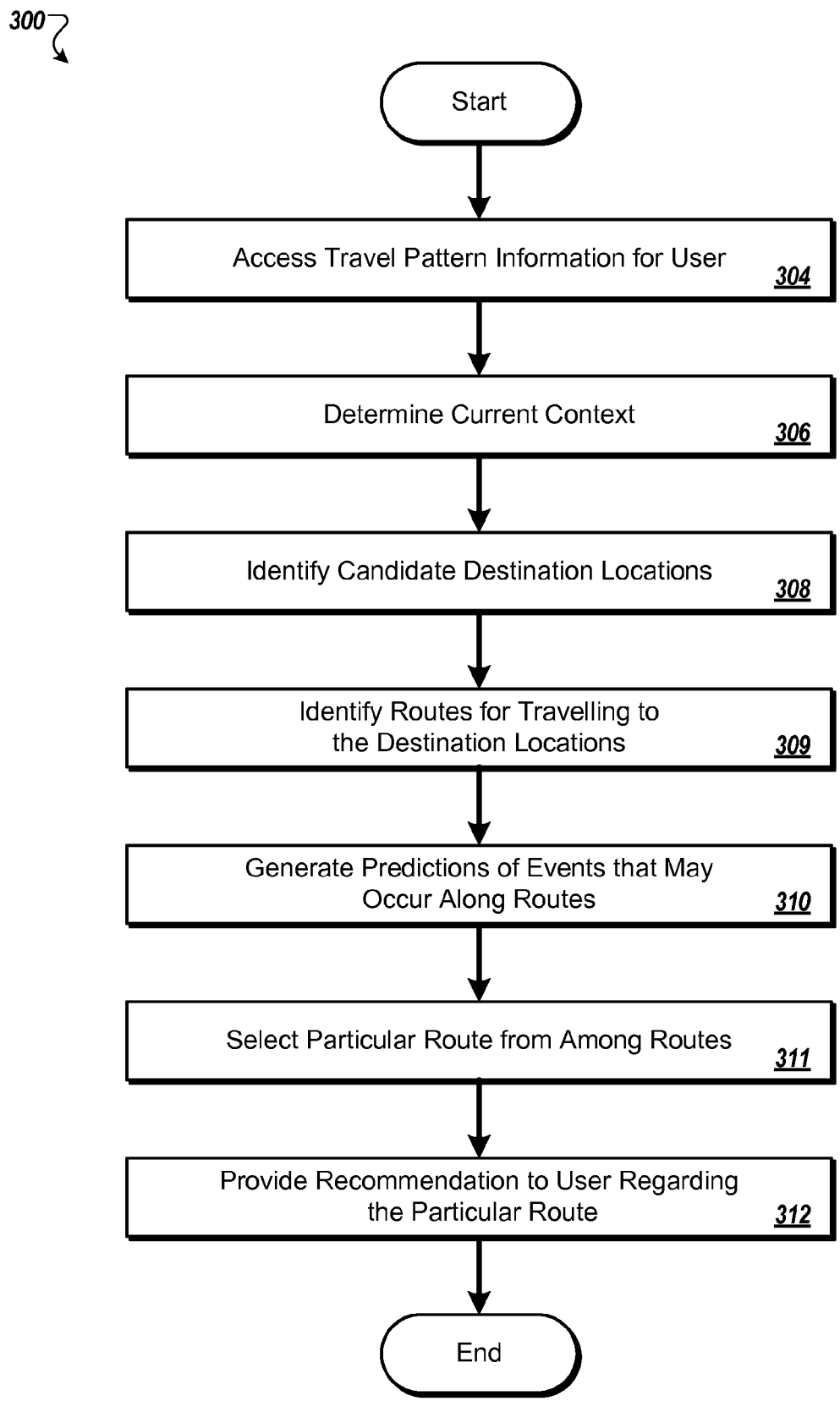
FIGS. 3A-B are flowcharts of example techniques for providing route recommendations on a mobile computing device.
Figure 3B:
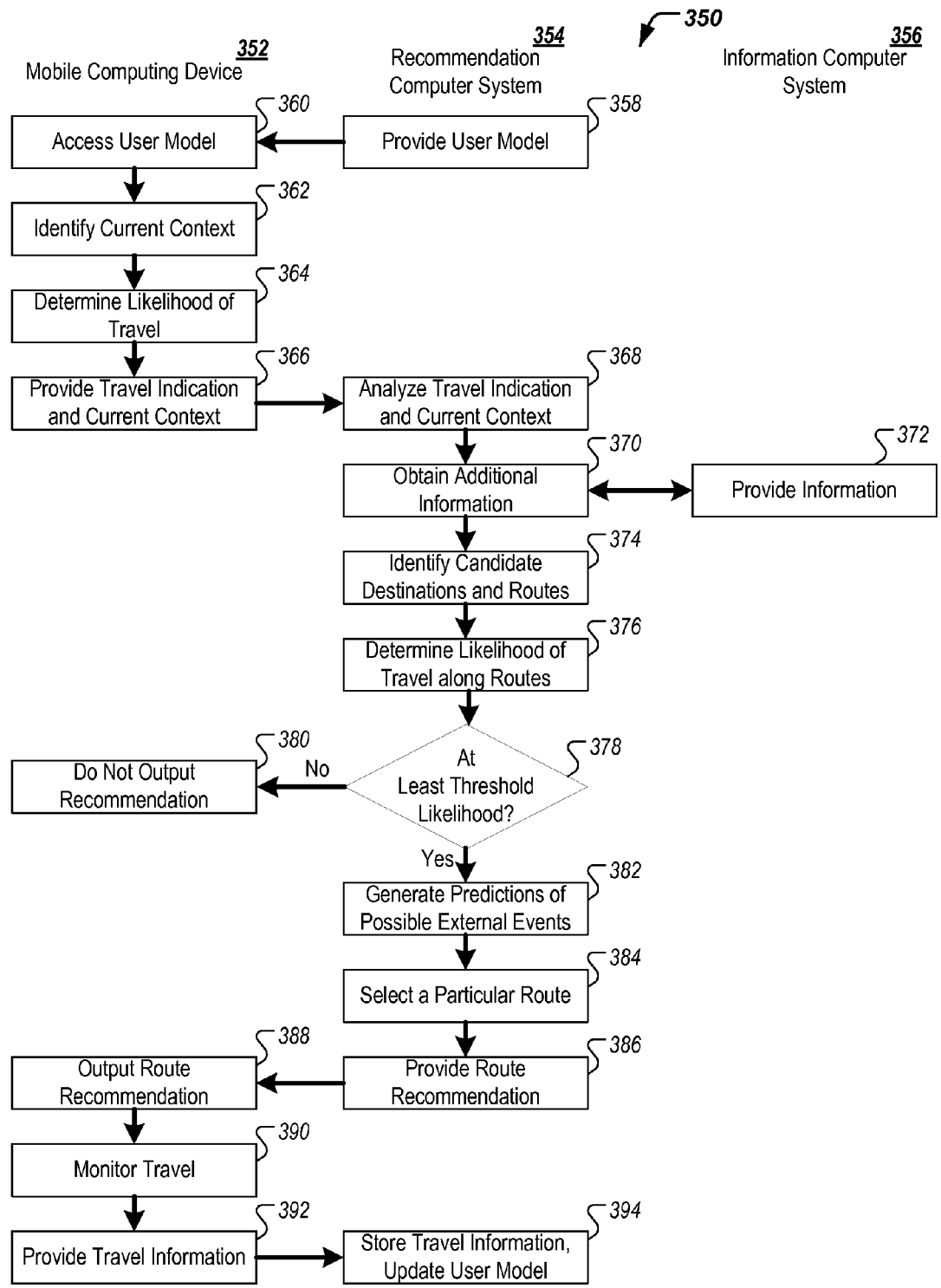

FIGS. 3A-B are flowcharts of example techniques 300 and 350 for providing route recommendations on a mobile computing device. Referring to FIG. 3A, the example technique 300 can be performed by any of a variety of appropriate computing devices, such as the mobile computing device 102 described above with regard to FIG. 1 and/or the mobile computing device 202 described above with regard to FIGS. 2A-B. Portions of the example technique 300 may be performed by different computing devices. For example, a portion of the example technique 300 may be performed by the mobile computing device 202 and a portion of the technique 300 may be performed by the mobile device server system 254.

The technique 300 begins by travel pattern information that identifies travel patterns for a user being accessed (304). In some implementations, the travel pattern information may be obtained from a user model associated with the user. For example, the mobile computing device 202 described above with regard to FIGS. 2A-B can store, maintain, and retrieve data related to user activity and travel in the user behavior data repository 242. Such user activity and travel data may include data related to commuting routes, errand trips, vacations, and other sorts of user activities and travel, and may be used to generate and maintain a model of the user of the mobile computing device 202. In addition, data such as search history data, calendar data, communications data (e.g., email, messaging, phone calls, etc.), social networking data, and other suitable data may also be used to generate and maintain the user model. In the present example, the mobile computing device 202 can identify user travel patterns from data included in the user model, and can store, maintain, and retrieve such pattern data in the pattern data repository 240 for future reference.

A current context for a mobile computing device and/or a user of the mobile computing device can be determined (306). The current context can include at least a current geographic location where a mobile computing device and/or an associated user are currently located. For example, the user may opt-in to a service which enables the mobile computing device 202 to identify his or her current geographic location using Global Positioning Service (GPS) technology or some other appropriate location identification technology. In the present example, the global positioning system (GPS) unit 216 can provide user location information to the mobile device context determination unit 214 regarding the user's current location. The user, for example, may be identified as being currently located at his or her workplace.

The current context for the user may include a current time of day, a current date, and one or more calendar events for the user. For example, the mobile device context determination unit 214 can access the time and date unit 228 and the calendar unit 230 as part of determining the current context for the user. In the present example, the mobile computing device 202 may determine that the current time is 5:00 pm on a Friday, and that there are no calendar events on the user's calendar for the rest of the day.

The current context for the user may be derived from one or more of a calendar application, an email application, and a social networking application. For example, as well as accessing the user's calendar, the mobile computing device 202 can access the user's e-mail and social networking accounts. In the present example, the user's social networking account may include a series of communications between the user and his or her friends that include a mention of a particular restaurant (e.g., "Joe's") across town from the user and a mention of a particular time (e.g., 6:00 pm).

One or more candidate destination locations can be identified based, at least in part, on the travel pattern information and the current context (308). The identified candidate destination location can be identified based on the user being determined to have at least a threshold likelihood of travelling to from the current geographic location to the candidate destination locations in the near future (e.g., within the next 15 minutes). For example, the prediction unit 238 and/or the recommendation unit 244 can determine probabilities that the user will travel to various locations, and can determine times that the user will likely want to arrive at such locations, based on the user's past activity and travel patterns and based on the current context. Threshold levels for identifying locations to which a user is likely to travel may include a predetermined value. For example, a predetermined value for a threshold level may be expressed as a probability percentage, such as 50%, 75%, 90%, 95%, 99%, and/or other appropriate values. In some implementations, threshold levels may be configurable by a user. By adjusting a threshold level, for example, a user may control the frequency of automatically provided recommendations and may control the likelihood that such recommendations are applicable to his or her current context.

Ranking or scoring techniques may be used to increment or decrement probabilities that the user will travel to various locations, based on various contextual factors. For example, the prediction unit 238 can reference the user model and the pattern data 240 to determine that in general, the user usually (e.g., a 90% probability) goes directly home after work, but sometimes (e.g., a 10% probability) goes to various other locations. However, today happens to be a Friday, and on Fridays the user is less likely (e.g., a 70% probability) to go directly home after work, with a possibility (e.g., a 20% probability) of going to the mall, or to some other location (e.g., a 10% probability). Moreover, today the user happened to take public transportation to work, and on such Fridays when the user takes public transportation to work, the user is even less likely to go directly home (e.g., a 50% probability), and is just as likely to go to a restaurant or bar (e.g., a 50% probability). Moreover, on Fridays when the user takes public transportation to work, and when the user communicates with his or her friends about "going to Joe's", the user is highly unlikely to go home first (e.g., a 5% probability) and is highly likely to take the bus across town to "Joe's" (e.g., a 95% probability). Thus, various current contextual factors may be considered together and in regard to a user's past activity and behavior to determine probabilities that the user intends to travel to one or more locations.

For the one or more identified destination locations, for example, the mobile computing device 202 can identify times that the user is likely to want to arrive at the locations. In the present example, the mobile computing device 202 may determine that the user is likely to go to "Joe's". Based on the context information including a social networking conversation between the user and his or her friends that mentions a particular time (e.g., 6:00 pm) for meeting at "Joe's", and based on historical user behavior data showing that the user generally prefers to show up on time for such meetings, the prediction unit 238 can determine that the user would prefer to leave work in time to arrive at "Joe's" at 6:00 pm. In the present example, the mobile computing device 202 may access the information server system 256 (e.g., a server hosting public transportation information) to identify public transportation schedules that may be relevant to user travel between the user's workplace and "Joe's".

Routes for travelling to the identified candidate destination locations can be identified (309). For example, the routes 142*a-b* are identified as possible routes for travelling to a particular destination location, as described above with regard to FIG. 1. The routes can be identified from a variety of sources, such as historic travel patterns/routes taken by the user (e.g., the user frequently travels to work using the highway) and/or routes suggested by a route generation system which may be local to and/or remote from the mobile computing device.

Predictions regarding one or more external events that may occur (e.g., that have at least a threshold probability of occurring) along the identified routes can be generated (310). In the present example, the mobile computing device 202 may access additional information server systems 256 that may provide current traffic conditions, weather forecasts, information related to event (e.g., sporting, concert, theatre, etc.) schedules, and other potentially relevant information. For example, based on such information, the prediction unit 238 may determine that a particular event (e.g., a baseball game) is nearing completion and has an 80% probability of ending between 5:10 and 5:20 pm. Moreover, the prediction unit 238 may determine that when similar events have ended at such a time on Fridays, there has historically been a negative impact on the bus schedule for the primary bus route between the user's workplace and "Joe's."

One or more particular routes can be selected using the event predictions (311). The one or more particular routes can be selected based on a variety of factors, such as the likelihood that the user will travel to the candidate destination locations, the likelihood that the user will find the recommendation to be helpful (e.g., examine how the user has previously responded to such recommendations), and/or the delay caused by the one or more predicted events.

In some implementations, the particular route may be selected to be provided to the user as a recommendation when there is at least a threshold level of confidence that the one or more events will affect travel along the one or more routes by at least a threshold amount of time (e.g., five minutes, ten minutes, fifteen minutes, or another appropriate predetermined and/or user-configurable threshold). In the present example, the prediction unit 238 and/or the recommendation unit 244 may determine that upon completion of the baseball game and for an hour after the completion, travel times along the bus route between the user's workplace and "Joe's" are likely to be delayed by fifteen minutes. Thus, the recommendation unit 244 can provide a recommendation to the mobile computing device 202 that the user depart his or her current location at an appropriate time to compensate for the predicted delay (e.g., based on the user's historical travel patterns), so that the user will arrive at the destination location at a preferred time. For example, if the recommendation unit 244 determines that the user should catch a bus at his or her regular stop at 5:15 pm to arrive at "Joe's" by 6:00 pm, that the user generally takes five minutes to walk to the stop, and that the user generally takes five minutes to prepare to leave work, the mobile computing device 202 may provide a recommendation at 5:05 pm that the user leave work to catch the bus to "Joe's".

A recommendation can be provided to the user regarding the selected particular route (312). The recommendation can be provided in a variety of ways, such as visually on a display and/or audibly using a speaker system. In some implementations, the recommendation may be provided without prompting by the user. For example, if the prediction unit 238 determines that there is greater than a threshold likelihood that the user intends to go to "Joe's", and there is greater than a threshold likelihood that one or more events may affect user travel along the route to "Joe's", and that such events are likely to affect travel along the route by more than a threshold amount of time, the mobile computing device 202 may automatically alert the user to take action at an opportune time. For example, the mobile computing device 202 may present a tactile (e.g., vibrating), auditory (e.g., chiming), and/or visual (e.g., flashing) alert along with a recommendation including a call to action (e.g., "Catch the Route 123 bus at 5:15 to arrive at Joe's by 6:00, or hail a cab!"). Thus, the user may be provided with information when events occur that are likely to affect the user's regular routine or schedule, at a time when the user can act upon such information.

In some implementations, the recommendation may be provided to the user in response to user input requesting a recommendation, when there is less than a threshold level of confidence that user travel will be affected. For example, if the prediction unit 238 determines that the user may decide to go to "Joe's", but that there are no external events that have more than a threshold likelihood of affecting normal or expected travel patterns along the user's regular bus route, the mobile computing device 202 may provide one or more recommendation upon user request. For example, the user can interact with an input control of the mobile computing device 202 to request recommendations, and the mobile device 202 can provide recommendations via a visual and/or audio output device. The mobile computing device 202 may provide information associated with the user's regular bus route and one or more alternate routes, for example, along with departure, arrival, and total travel times.

In some implementations, if user intent is ambiguous, information regarding one or more destinations of potential interest to a user may be provided to the user. For example, if the prediction unit 238 is unable to determine whether the user intends to travel to any particular destination with a degree of certainty (i.e., a threshold is not reached), information about multiple possible user destinations can be provided to the user upon request. If the prediction unit 238 is unable to determine whether the user intends to go home, to the mall, or to a restaurant, for example, summary information related to all three possibilities may be provided to the user (e.g., in a ranked list ordered by interest likelihoods) by the computing device 202, and the user may select the preferred destination to receive additional travel information (e.g., routes, maps, projected departure/arrival times, contact information, hours of operation, etc.) regarding the destination.

By providing certain information without prompting by a user when a probability threshold is crossed, and other information upon user request, for example, information can be provided automatically when it is timely and when it is likely to be useful to users. False positives (i.e., irrelevant information) may be reduced, thus reducing unnecessary user distractions. Moreover, information that is somewhat likely to be relevant to the user may be readily available if the user chooses to access it.

Referring to FIG. 3B, the technique 350 can be performed in part by a mobile computing device 352, a recommendation computer system 354, and an information computer system 356. The mobile computing device 352 can be any of a variety of appropriate mobile computing devices, such as the mobile computing device 102 and/or the mobile computing device 202. The recommendation computer system 354 can be any of a variety of appropriate computer systems, such as the mobile device server system 254. The information computer system 356 can be any of a variety of appropriate computer systems, such as the information server system 256.

The example technique 350 can begin with the recommendation computer system 354 providing a user model to the mobile computing device 352 (358). As discussed above with regard to FIGS. 2A-B, the user model can include a variety of information that can indicate behavior of a user of the mobile computing device 352, such as historic travel patterns of the user and correlations between activity and travel (e.g., correlations between map-based search queries and subsequent travel). The user model can be maintained by the recommendation computer system 354 with user permission through an opt-in mechanism.

The mobile computing device 352 can access the user model (360) and can use the user model to monitor for contexts within which the user is likely to travel to another geographic location. As part of such monitoring, the mobile computing device 352 can periodically (e.g., every 10 seconds, every minute, every 5 minutes, every half hour, every hour, every day) identify a current context of the mobile computing device (362) and can compare the current context to the user model to determine a likelihood that the user will travel to another location in the near future (364). If at least a threshold likelihood is determined (e.g., at least a 25%, 50%, 75%, 90% chance that the user will travel to another location), then the mobile computing device 352 can request a route recommendation by providing an indication that the user is likely to travel and at least a portion of the current context to the recommendation computer system 354 (366).

In response to receiving the travel indication from the mobile computing device 352, the recommendation computer system 354 can analyze the current context (368) and can obtain additional information that may be relevant to the current context from one or more third party information sources (370), such as the information computer system 356. For instance, the recommendation computer system 354 can request relevant information, like traffic or weather information that pertains to an area around the current geographic location of the mobile computing device 352, from the information computer system 356 and the information computer system 356 can provide the requested information to the recommendation computer system 354 (372). Using the current context and the additional information, the recommendation computer system 354 can identify candidate destinations and routes for travelling to the candidate destinations (374), similar to the techniques described above.

The recommendation computer system 354 can determine the likelihood that a user of the computing device will travel along the identified routes based on a variety of information (376), such as previous user behavior with regard to the current context and/or previous user behavior with regard to route recommendations. The recommendation computer system 354 can further determine whether there is at least a threshold likelihood that the user will travel along the one or more identified routes (378). If the user is not likely to find any of the possible routes to be helpful or relevant given the current context, the recommendation computer system 354 can determine that no recommendation should be provided and can provide an indication to the mobile computing device 352 that no recommendation is being provided. In response, the mobile computing device 352 will not output a route recommendation (380).

However, if there is determined to be at least a threshold likelihood that the user will travel along one or more of the identified routes, the recommendation computer system 354 can generate predictions for one or more possible events that may occur at a future time along the one or more routes (382). A particular route can be selected (384) based on a variety of factors, including previous user behavior, the current context, and/or external events that are predicted to occur along the one or more routes. Using the selected particular route, the recommendation computer system 354 can provide a route recommendation (386) to the mobile computing device 352, which can in turn output information identifying the recommended route to the user (388). As discussed above, the mobile computing device 352 can output such information in a variety of ways, such as visually and/or audibly.

After outputting the route recommendation, the mobile computing device 352 can monitor travel for at least a threshold period of time (390). The monitoring can be with the permission of the user through opt-in consent of the user. Information indicating whether the user found a particular route recommendation to be helpful and/or relevant given the current context can be helpful in providing more relevant and helpful recommendations in the future. The mobile computing device 352 can provide information regarding travel following the outputting of the route recommendation to the recommendation server system 354 (392), which can store the travel information and use it to provide route recommendations to the user at a later point in time (394). The travel information can also be used to update a user model to reflect how the user behaved with regard to travelling given the current context (394).

Although distribution of the technique 350 across the mobile computing device 352, the recommendation computer system 354, and the information computer system 356 is depicted in a particular arrangement, portions of the technique 350 may be performed by a different device or system than depicted in the technique 350. For example, the mobile computing device may periodically provide current context information to the recommendation computer system 354 and the recommendation computer system 354 may determine a likelihood of travel (364) using the current context information from the mobile computing device 352.

Figure 4:
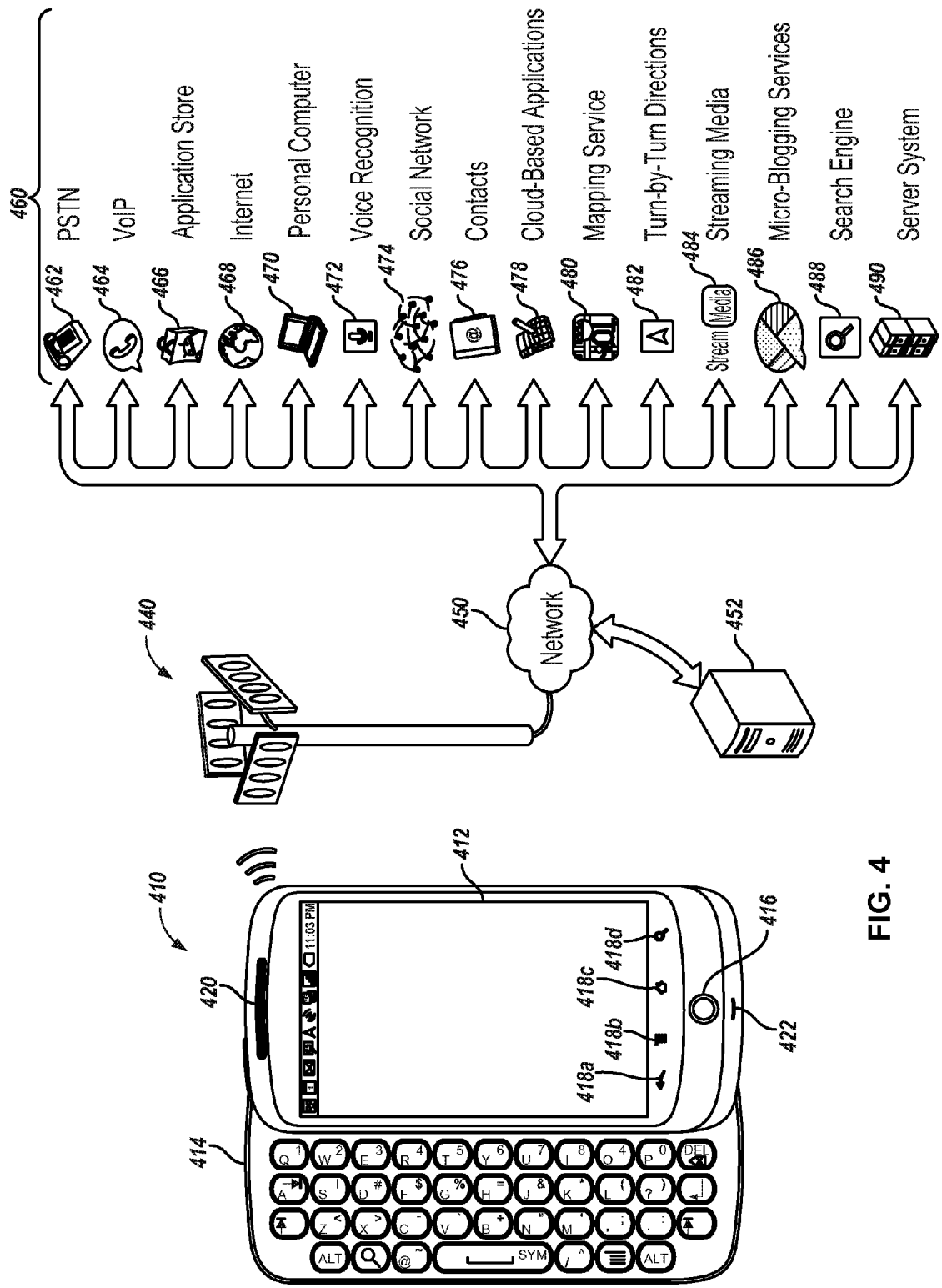
FIG. 4 is a conceptual diagram of a system that may be used to implement the techniques, systems, mechanisms, and methods described in this document.

FIG. 4 is a conceptual diagram of a system that may be used to implement the techniques, systems, mechanisms, and methods described in this document. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-4', '*', and The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418*a-d*. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile computing device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a predefined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. Unlike an application program, which may not be invoked until a user selects a corresponding icon, a widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user with capabilities (e.g., provide a graphical user interface, provide an audio user interface) to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

Figure 5:
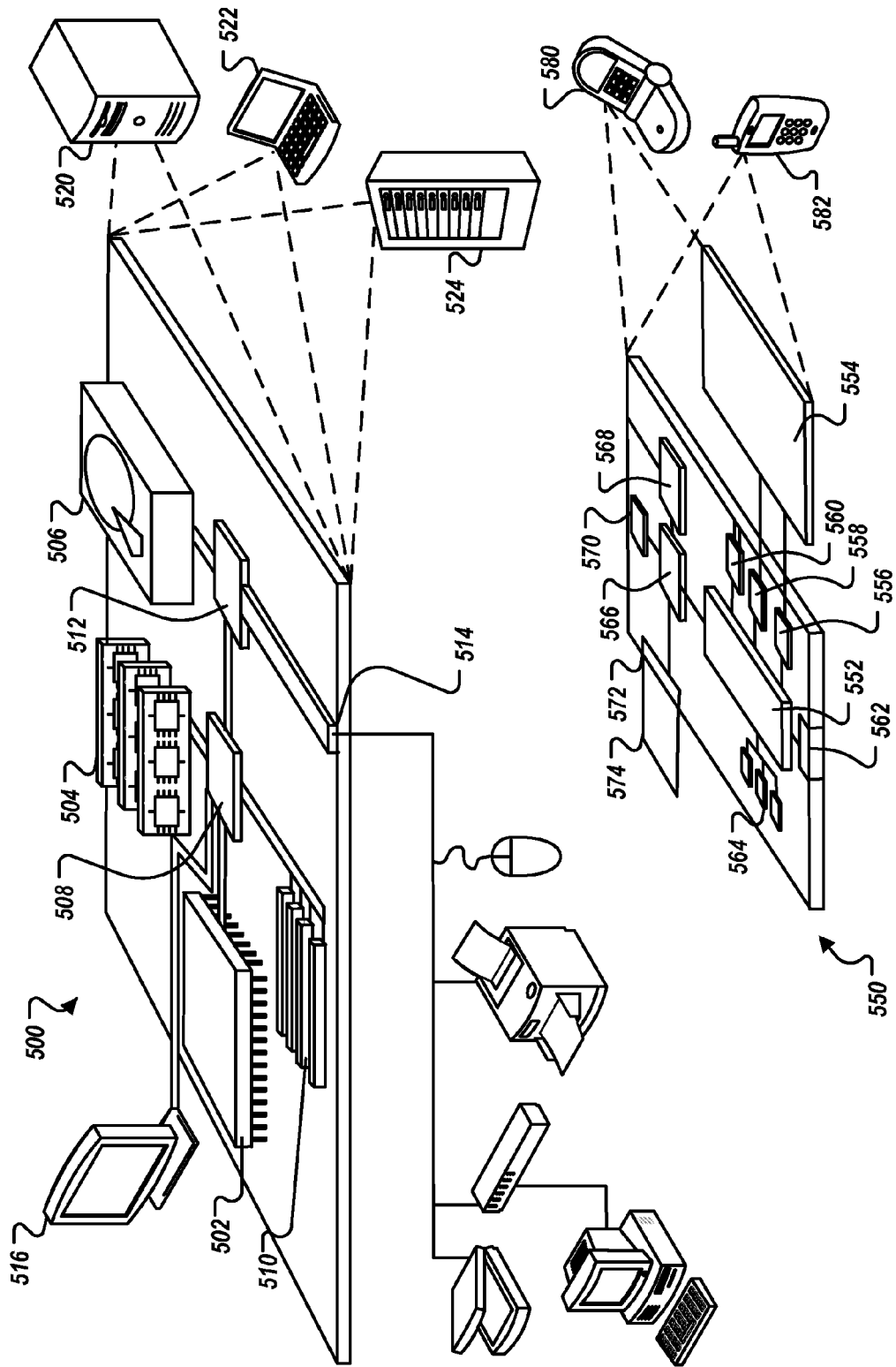
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, may be meant to be examples only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing results to route recommendations on a mobile computing device may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
    obtaining, at a computer system, information that indicates historic routes along which a mobile computing device has previously moved, wherein the mobile computing device is associated with a user;
    identifying, by the computer system, a current geographic location at which the mobile computing device is currently located;
    identifying, by the computer system, a predicted location to which the mobile computing device has at least a threshold likelihood of traveling based on the current geographic location and the obtained information that indicates the historic routes along which the mobile computing device has moved;
    identifying, by the computer system, a plurality of predicted routes for traveling from the current geographic location to the predicted location based on the predicted location and the current location;
    generating, by the computer system, a prediction that a future event that has yet to occur has at least a threshold probability of occurring along a first predicted route of the predicted routes for traveling from the current geographic location to the predicted location;
    selecting, by the computer system, a particular predicted route from the plurality of predicted routes to recommend to the user based on the generated prediction that the future event has at least a threshold probability of occurring; and
    providing, by the computer system, route information that identifies the selected particular predicted route, so as to cause the mobile computing device to provide an indication that the user travel the selected particular predicted route.

2. The computer-implemented method of claim 1, wherein identifying, by the computer system, the predicted location to which the mobile computing device has at least the threshold likelihood of traveling is further based on at least one of a group consisting of: a current time of day, a current date, and one or more calendar events for the user.

3. The computer-implemented method of claim 1, wherein identifying, by the computer system, the predicted location to which the mobile computing device has at least the threshold likelihood of traveling is further based on recent user activity with regard to one or more applications that are installed on the mobile computing device.

4. The computer-implemented method of claim 3, wherein the one or more applications are selected from a group consisting of: an email application, a calendar application, a texting application, a voicemail application, a telephone application, and a social networking application.

5. The computer-implemented method of claim 1, wherein the information that indicates historic routes along which the mobile computing device has previously moved is obtained from a user model that is associated with the user.

6. The computer-implemented method of claim 1, wherein the particular predicted route is selected from the plurality of predicted routes based on the future event, being predicted to increase, by at least a threshold amount of time, an amount of time during which travel along another one of the plurality of predicted routes is estimated to require.

7. The computer-implemented method of claim 1, wherein the route information that identifies the particular predicted route is provided without being prompted by the user.

8. The computer-implemented method of claim 1, wherein the route information is provided in response to user input that indicates a request for a route recommendation.

9. The computer-implemented method of claim 1, wherein
the computer system comprises the mobile computing device; and
providing the route information comprises outputting the route information on the mobile computing device.

10. The computer-implemented method of claim 1, wherein the mobile computing device provides the indication that the user of the mobile computing device travel the selected particular predicted route by displaying, on a display of the mobile computing device, a map that depicts the particular predicted route or by displaying textual directions for traveling along the particular predicted route.

11. The computer-implemented method of claim 1, wherein the mobile computing device provides the indication that the user of the mobile computing device travel the selected particular predicted route by audibly outputting, using one or more speakers of the mobile computing device, directions for traveling along the particular predicted route.

12. The computer-implemented method of claim 1, wherein;
the computer system is separate from the mobile computing device; and
the method further comprises: receiving, at the computer system and from the mobile computing device, a request to provide a route recommendation for the user of the mobile computing device, wherein the request includes information that identifies the mobile computing device.

13. The computer-implemented method of claim 1, further comprising receiving, by the computing system and after providing the route information, an indication that the future event has begun to occur.

14. The computer-implemented method of claim 1, wherein the future event is an event that is predicted to occur at an intermediate location along the first route of the plurality of predicted routes between the current geographic location and the predicted location.

15. The computer-implemented method of claim 14, wherein selecting the particular predicted route from the plurality of predicted routes includes selecting the particular predicted route instead of the first route in order to avoid the future event, even though the first route would otherwise be selected from the plurality of routes for recommendation to the user.

16. A computing system comprising:
an input subsystem programmed to identify a current geographic location at which a mobile computing device is currently located;
a travel monitor unit programmed to obtain information that identifies historic routes along which the mobile computing device previously moved;
a destination unit programmed to identify a predicted location to which the mobile computing device has at least a threshold likelihood of traveling based on the current geographic location and obtained information that identifies the historic routes along which the mobile computing device previously moved;
a route unit programmed to identify a plurality of predicted routes for traveling from the current geographic location to the predicted location based on the input subsystem having identified the current geographic location and the destination unit having identified the predicted location;
an event prediction unit programmed to generate a prediction that a future event that has yet to occur has at least a threshold probability of occurring along a first route of the plurality of predicted routes for traveling from the current geographic location to the predicted location;
a recommendation unit programmed to select a particular predicted route from the plurality of predicted routes to recommend to the user based on the event prediction unit having generated a prediction that the future event has at least the threshold probability of occurring along the first route of the plurality of predicted routes; and
an output subsystem of the mobile computing device that is programmed to output route information that identifies the selected particular predicted route, so as to cause the mobile computing device to provide an indication that the user of the mobile computing device travel the selected particular predicted route.

17. The mobile computing device of claim 16, wherein the output subsystem comprises a display of the mobile computing device that is configured to visually output the route information.

18. The mobile computing device of claim 16, wherein the output subsystem comprises a speaker system of the mobile computing device that is configured to audibly output the route information.

* * * * *